Jan. 16, 1968  C. A. ELWELL  3,363,904
TOY SOUND REPRODUCING DEVICE
Original Filed March 19, 1962  2 Sheets-Sheet 1

INVENTOR.
CHARLES A. ELWELL
BY
ATTORNEYS

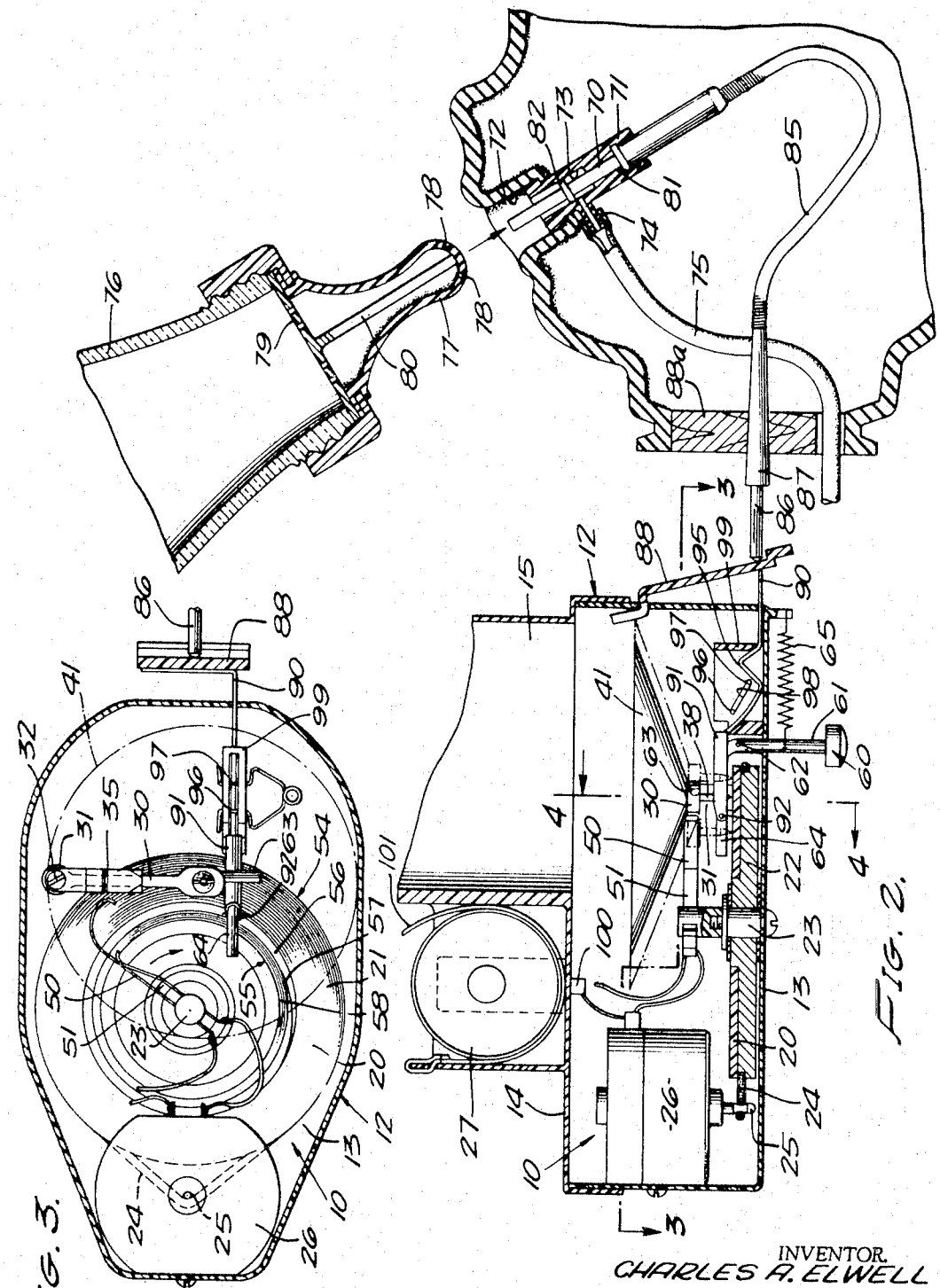

United States Patent Office 3,363,904
Patented Jan. 16, 1968

3,363,904
TOY SOUND REPRODUCING DEVICE
Charles A. Elwell, Gardena, Calif., assignor to The Toy Development Center, Inc., Beverly Hills, Calif., a corporation of Nevada
Original application Mar. 19, 1962, Ser. No. 180,584, now Patent No. 3,234,687, dated Feb. 15, 1966. Divided and this application Mar. 22, 1965, Ser. No. 441,606
4 Claims. (Cl. 274—1)

ABSTRACT OF THE DISCLOSURE

A sound reproducing device utilizing two spaced sound tracks of contrasting import and contained within a housing; the device being operated externally of the housing to terminate reproduction from the first sound track at any point thereon and immediately reproduce from the beginning of the second sound track, or caused to move from the end of the second sound track to the beginning of the first sound track.

---

This invention relates to a sound reproducing device or phonograph, particularly adapted to be used in conjunction with or installed in a toy such as a doll or the like, and is a division of Patent No. 3,234,687, issued Feb. 15, 1966, Ser. No. 180,584, filed Mar. 19, 1962.

The apparatus of the present invention comprises a relatively simple and inexpensive sound reproducing system or phonograph device designed, for example, to be housed in a child's toy such as within the torso of a life-size baby doll. An important feature of the present invention resides in providing a single-track or groove phonograph record having recorded thereon an initial sound sequence and an individual terminal sound sequence, the terminal sound sequence being adapted to be reproduced or "played" at any time during the reproduction of the initial sound sequence in response to a manipulation by the user of the phonograph. This feature makes it possible, for example, to house the phonograph device within the torso of a life-size baby doll or the like, and to incorporate in the record sound sequences indicative of the "mood" of the doll, which mood is variable depending upon the activity of the user. Thus, in one embodiment of the present invention, the record has transcribed thereon an initial sound sequence which, upon starting of the device by the user, reproduces the crying sounds of a hungry or otherwise uncomfortable baby, but such crying sounds are realistically terminated and transformed into the gurgling and cooing sounds of a well-fed or otherwise satisfied baby at the will of the user, as by placing the nipple of a feeding bottle into the doll's mouth, whereupon the satisfied sounds immediately begin, regardless of the position of the needle in the initial sound sequence portion of the record track, the satisfied sounds of the terminal portion of the record diminishing in volume and finally ending completely. Another example of the application of this feature is a combination wherein the initial crying sound sequence is followed by a laughing or giggling terminal sequence, the crying sound being automatically terminated and immediately followed by the laughing sound sequence when the user tickles the doll on the usual sensitive areas under the ribs.

An important object of the present invention is therefore to provide a novel phonograph apparatus adapted to reproduce initial and terminal sound sequences in response to appropriate manipulation by the user.

A further object of the present invention is to provide a novel phonograph apparatus incorporated in a toy figure such as a doll, the apparatus being provided with a phonograph record adapted to reproduce sounds typical of the toy figure in response to manipulations of the user in the same manner as would be required to produce the same or similar sounds from a live figure.

A further object of the present invention is to provide a sound reproducing system for a toy which is relatively simple and inexpensive yet sufficiently rugged to withstand the manipulations of a child necessary to actuate the system.

Further and more detailed objects of the present invention it is believed will be readily apparent from the following detailed description of a preferred embodiment thereof, when read in connection with the accompanying drawings.

In the drawings:

FIGURE 2 is a sectional view taken substantially on the line 2—2 of FIGURE 1.

FIGURE 3 is a sectional view taken substantially on the line 3—3 of FIGURE 2.

Figure 1:
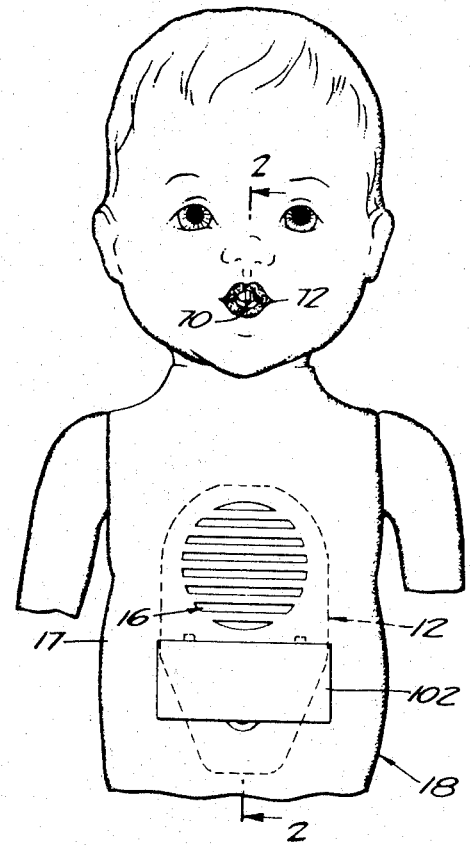
FIGURE 1 is a front elevation of the torso and head of a doll incorporating the present invention.

Referring now to the drawings, the apparatus of the present invention comprises a phonograph 10 mounted in a housing 12, the bottom 13 of which may conveniently comprise the back wall portion of a hollow doll torso 18. The top wall 14 of the housing may include a cylindrical sound chamber 15 terminating in a speaker grid 16 formed in the front wall 17 of the torso. The phonograph includes a record 20 of generally conventional disc construction having a single helical record groove or track 21, the record being supported on a disc member 22 mounted on a spindle 23 driven by a belt 24 which is connected to the drive shaft 25 of a motor 26 powered by a battery 27.

Figure 4:
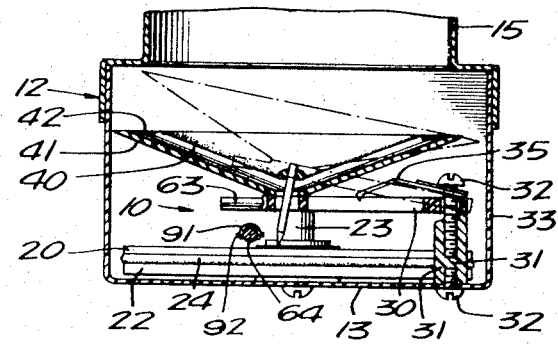
FIGURE 4 is a sectional view taken substantially on the line 4—4 of FIGURE 2.

A tone arm 30 is provided, the arm being mounted on a post 31 secured to the housing bottom wall 13 by means of a screw member 32 extending through an oversize aperture in the end of the arm. In this manner, the arm is free to pivot about an axis perpendicular to the plane of the bottom wall 13 and the plane of the record 20, and to also pivot about an axis generally parallel to such planes, with the outer end of the tone arm being free to move upwardly and away from the record as best shown in FIGURE 4. Means are provided biasing the tone arm in the direction of the record, and as shown in FIGURE 4, these means may include a leaf spring 35.

The tone arm carries a conventional phonograph needle 38 having a pointed lower end adapted to ride in the record track, the needle extending upwardly through the tone arm and said upper end of the needle being operably connected to a speaker cone 40, as by cementing or the like. The cone, which is preferably made of paper or other suitable material is supported by a housing 41 secured to the top surface of the outer end of the tone arm 30. As shown in FIGURE 4, the tone arm is preferably provided with a peripheral flange having corrugations 42, the outer periphery of the flange being cemented to the upper rim of the housing 41.

The battery switch comprises a pair of conductor leaf spring members 50 and 51, most conveniently secured at their inner ends to the spindle 23, the member 50 being provided with a curved end adapted to be contacted by the tone arm when the tone arm is in the record completed or ended position, to move the member 50 to the left as seen in FIGURE 3 and to open the switch.

Figure 5:
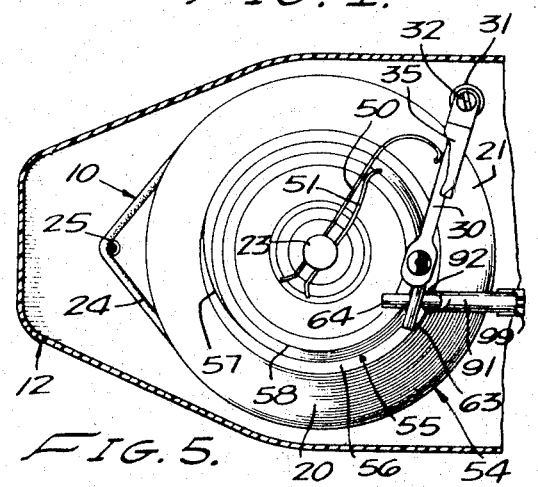
FIGURE 5 is a fragmentary sectional view similar to FIGURE 3, but illustrating the tone arm in position to reproduce the terminal portion of the record.

While, as indicated above, the record 20 is of generally conventional construction, this applies to the overall construction and material thereof, but it will be noted that the record incorporates an important feature of the present invention in that the record track 21 is provided with an initial sound sequence portion generally indicated 54 and a terminal sound sequence portion generally indicated 55, a blank or transition area 56 being provided between these sound sequence portions, the record track helix angle being increased in the area 56 as indicated at 57 in FIGURE 5 to spread over the area 56, for a purpose to be described below, the portion of the record track traversing the area 56 having recorded thereon the end of the initial sound sequence and the beginning of the terminal sound sequence portion.

Means are provided for initiating or starting the operation of the phonograph, and as shown in the drawings these means may include means for lifting the tone arm 30 away from the record 20 to clear the needle 38 out of the end 58 (FIGURE 5) of the record track and to transport the tone arm to the record starting position shown by the right-hand phantom lines in FIGURE 2. The starting means includes an L-shaped, manually operated lever 60 having a leg 61 extending through an opening in the bottom wall 13 and pivotally connected to a housing extension member at 62. An extension rod 63 extends outwardly from the free end of the tone arm 30, overlying the other leg 64 of the lever 60. A coil spring member 65 normally biases the lever 60 into the starting position shown in FIGURE 2.

Means are provided for lifting the tone arm away from the record at any given time during the reproduction of the initial sound sequence portion 54, and for transporting the tone arm and placing the needle in the record track at the beginning of the terminal sound sequence portion 55. As shown in the drawings, these means may include an actuator plunger 70 slideably mounted in fitting 71 supported in the open mouth 72 of the doll, the fitting 71 being provided with an enlarged bore 73 and a bored side extension 74 to which may be connected a tubing 75 leading to an outlet (not shown) in the lower portion of the doll, the tubing 75 being provided to carry away water fed into the mouth from a feeding bottle 76, whereby the conventional "drink and wet" feature is incorporated. The bottle 76 is of generally conventional configuration and includes a generally conventional nipple 77, the nipple being provided with a liquid outlet 78. Extending across the mouth of the bottle is perforated disc 79 carrying a relatively stiff but somewhat flexible rod element 80, the rod element extending into contact with the inner surface of the outer end of the nipple 77 to lend rigidity thereto. Means are provided for preventing the leakage of water into the reduced bore 81 of the fitting 71 and as shown in the drawings these means may include a sealing flange 82 carried by the plunger 70 and adapted to seat against the bottom of the bore 73 when the plunger is in the depressed position.

The plunger 70 is connected by means of a flexible connector 85 to a rod 86 slideably mounted within a fitting 87 carried on a partition member 88a. The rod 86 contacts an arm 88 which is operably connected to the housing for swingable movement with respect thereto, the arm 88 in turn contacting one end of a wire member 90, the other end of the member 90 contacting the underside of a saddle member 91 in slideable relation therewith. The saddle member 91 is pivotally connected at 92 to the leg 64 of the lever 60 for pivotal movement to the position shown in FIGURE 6 upon actuation by the wire member 90. Means are provided for normally maintaining the plunger 70 and its associated parts in the position shown by the solid lines in FIGURES 2 and 7, and as shown in the drawings, these means may include a bent portion 95 of the wire member 90 and a spring element having a pair of legs 96 and 97 operable within a pair of parallel, inclined grooves 98 in the housing extension member 99, the leg 96 abutting against the ends of the grooves and the leg 97 contacting the bent portion 95.

The battery 27 is maintained in position by means of the usual leaf spring battery contacts 100 and if desired a web member 101 is provided to permit ready removal of the battery through a conveniently located door 102 in the front wall of the doll torso.

In operation of the apparatus described above, assuming the tone arm 30 and its associated parts is in the normal "ended" or record terminated position illustrated by the left-hand phantom lines of FIGURE 2, the phonograph is started at the will of the operator merely by moving the lever 60 to the left as seen in FIGURE 2, thus pivoting the lever and causing the free end of the leg 64 to move upwardly and away from the record 20. In so doing, the leg 64 contacts the arm 63 on the tone arm, lifting the tone arm and also the needle away from contact with the record, continued upward movement of the leg 64 causing the tone arm and its associated parts to move to the starting position illustrated by the right-hand phantom lines in FIGURE 2, the end of the arm 88 acting as a stop against which the housing 41 abuts to limit further movement of the tone arm and its associated parts. It will be noted that prior to movement of the tone arm as thus described, the tone arm was in a position to contact the switch spring member 50, holding it away from contact with the spring member 51 and thus maintaining the switch in the open position, as shown best in FIGURE 5. Upon movement of the tone arm and its associated parts to the right as seen in FIGURE 2, the spring 50 is permitted to come into contact with the spring 51, closing the switch and energizing the motor 26 to initiate rotation of the record 20. Upon releasing the lever 60, it is moved to the normal solid line position by the spring 65, thus lowering the tone arm and the needle so that the needle contacts the record 20 and, upon the continued rotation thereof, the needle finds its way into the record track and reproduction of the initial sound sequence portion begins. If no further action is taken by the operator, the needle will remain in the record track and the record will be played to the very end, including the terminal sound sequence portion 55, whereupon the tone arm will be in a position to move the spring 50 to the switch open position of FIGURE 5 at which time the motor will stop.

Figure 6:
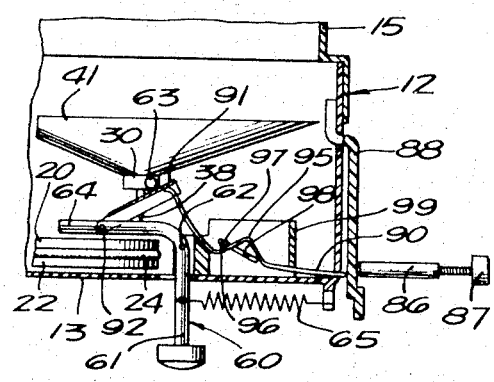
FIGURE 6 is a fragmentary view similar to FIGURE 2, but illustrating the positions of the parts during the transfer of the tone arm from the initial sound sequence portion to the terminal sound sequence portion.
Figure 7:
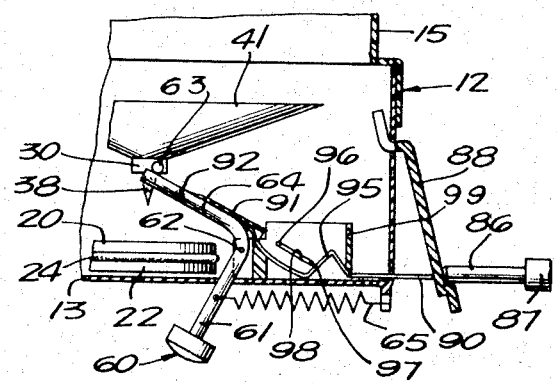
FIGURE 7 is a view similar to FIGURE 6, but illustrating the positions of the parts during the transfer of the tone arm to the starting position.

In normal use of the apparatus however, the operator will desire to "comfort" the doll and in the use of the specific example of apparatus described above, the operator will insert the nipple 77 or other applicable object into the mouth opening 72. In so doing, the longitudinally-rigid nipple 77 contacts the end of the plunger 70, moving it inwardly from the position shown in FIGURE 2. This in turn moves the rod 86 to the left as seen in FIGURE 2, also resulting in movement of the arm 88 and wire member 90 in the same direction, the left-hand end of the wire member 90 being thus moved to the left and upwardly, causing the saddle member 91 to pivot to the position shown in FIGURE 6 wherein the saddle member contacts the arm 63 and raises the tone arm and its associated parts upwardly and away from the record 20. Continued upward pivotal movement of the saddle member 91 forces the tone arm and its associated parts in the leftward direction as seen in FIGURES 2 and 6, until the needle reaches a position immediately above the pivot point 92 at which point the needle is deposited upon the record in the blank area 56, continued turning of the record causing the needle to be picked up by the record track and to continue therein, reproducing the terminal sound sequence portion of the record. Thus, it is to be understood that regardless of the position of the needle in the initial sound sequence portion of the record, the operator can immediately cause the sound sequence, in this case the "crying" sound, to cease merely by placing the nipple in the mouth, the doll responding, as would a live baby, with realistic sounds of pleasure such as gurgling and cooing, these sounds diminishing in volume and ending with the ending of the record, whereupon the parts are in a position for a repetition of the entire operation at the will of the operator. It is to be noted that the switch arm 50 acts as a stop for the tone arm 30 after actuation by saddle 91 to prevent the needle 38 from sliding over the area 55 by the momentum it has gained through sliding down the saddle.

It is believed that it will be understood from the above description that the apparatus of the present invention is extremely simple yet highly effective and designed for use even by the youngest of children capable of playing with dolls. As an illustration of the simplicity of operation of the device, it will be understood that in the remote event that the operator were to move the lever 60 to the starting position and move the nipple into the mouth 72, the tone arm and its associated parts would be lifted upwardly and away from the record and would be forced to a neutral position immediately above the pivot point 92. In this position, the switch would be closed so that the record would be turning, but there would be no contact of the needle in the record track until the lever 60 were released.

As is apparent from the above, the apparatus of the present invention can be applied to different structures to produce varying effects. By way of further example, the specific means described above for shifting the tone arm from the initial portion of the record to the terminal portion of the record can be changed to embody a plunger (not shown), but generally similar to the plunger 70, positioned at a sensitive spot on the doll body to there be actuated by the finger of the operator in simulation of tickling of the doll. In this example, it may be desirable to provide a record wherein the initial sound sequence portion is adapted to reproduce crying or other sounds of discomfort or displeasure, whereas the terminal sound sequence portion of the record would be adapted to reproduce giggling or laughing sounds. Otherwise, the structure and operation of such an apparatus would be generally the same as that described above.

It will be further observed that the apparatus is designed to function in all respects in any positional attitude of the housing and the apparatus contained therein.

Having fully described my invention, it is to be understood that I do not wish to be limited to the details set forth, but my invention is of the full scope of the appended claims.

I claim:

1. A phonograph, comprising: a record having an initial sound track and a terminal sound track of contrasting context; sound reproducing means for playing said record; selectively operable control means having a first condition permitting the playing of both of said sound tracks in sequence, and selectively manipulable to a second condition for separating said reproducing means from said record and terminating reproduction of the initial sound track at any point therein and means responsive to said control means reaching said second condition for initiating substantially immediate return of said reproducing means to said record and reproduction of the terminal sound track by said reproducing means; means enclosing and concealing said record, playing means and control means to prevent direct access thereto; and manual means accessible outside said enclosure for changing said control means from its first condition to its second condition.

2. The apparatus of claim 1 wherein said reproducing means includes a pivoted tone arm carrying a phonograph needle adapted to traverse said track, power operated means for driving said record, and switch means cooperating with said tone arm to energize said power means to initiate and terminate the driving of said record depending upon the position of said tone arm with respect to said record; and said control means includes a device traversing said initial sound track and terminating at the beginning of said terminal sound track for lifting and deflecting said phonograph needle from said initial sound track irrespective of its position thereon and depositing said needle on said terminal sound track.

3. The apparatus of claim 1 wherein said reproducing means includes a pivoted tone arm carrying a phonograph needle adapted to traverse said track; and said control means includes a first arm traversing both of said sound tracks and tiltable to lift and deflect said tone arm from the end of the terminal sound track to the beginning of the initial sound track, and a second arm traversing said first sound track and terminating at the beginning of the said terminal sound track to lift and deflect said tone arm from any point over said initial sound track to the beginning of said second sound track.

4. A phonograph, comprising: a record having an initial sound track and a terminal sound track being of contrasting context; means for playing said record; multi-part control means for controlling the position of said playing means; means enclosing and concealing said record, said playing means, and said control means for preventing direct access thereto; first manual means accessible outside said enclosure for actuating one part of said multi-part control means; said one part being a first pivotally mounted cam element which is actuated by being pivoted to lift said playing means from said initial sound track; said cam element, when lifted being a slide upon which said playing means slides into engagement with said terminal sound track for initiating substantially immediate reproduction of the terminal sound track.

References Cited

UNITED STATES PATENTS

| 1,485,137 | 2/1924 | Hunter | 274—14 |
| 2,552,757 | 5/1951 | Adler et al. | 274—14 XR |
| 2,845,272 | 7/1958 | Kamler | 274—14 |
| 2,888,267 | 5/1959 | Murro | 274—15 |
| 2,952,464 | 9/1960 | Stimler | 274—15 |

LEONARD FORMAN, *Primary Examiner.*

L. ANDERSON, *Assistant Examiner.*